(No Model.)
J. M. HICKS.
Cistern Spout and Trap therefor.
No. 232,820.    Patented Oct. 5, 1880.
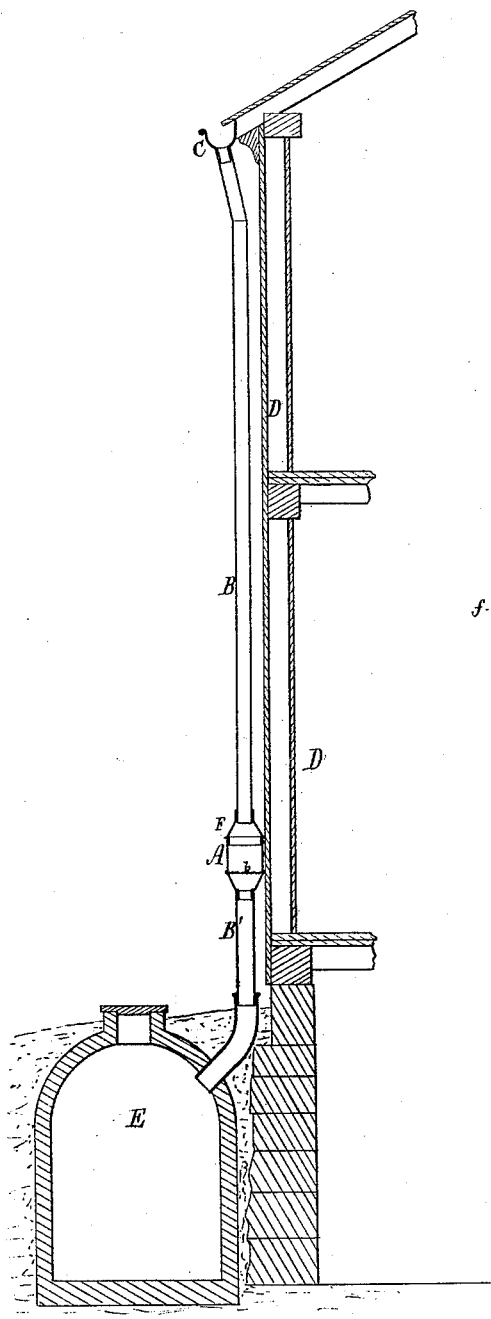
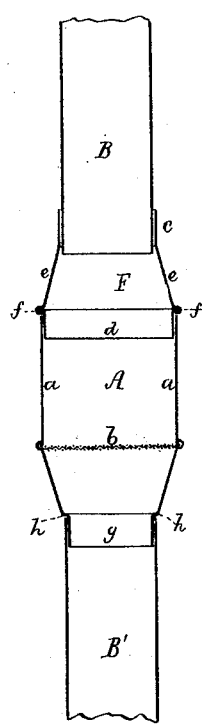
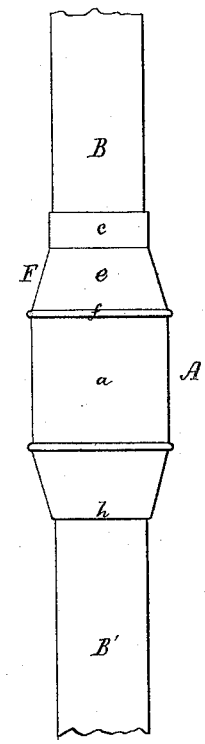
Witnesses
S. N. Piper
Wm W. Lunt
Inventor.
Josephine M. Hicks.
by R. K. Eddy atty.

UNITED STATES PATENT OFFICE.

JOSEPHINE M. HICKS, OF BOSTON, MASSACHUSETTS.

CISTERN-SPOUT AND TRAP THEREFOR.

SPECIFICATION forming part of Letters Patent No. 232,820, dated October 5, 1880.

Application filed July 28, 1880. (No model.)

*To all whom it may concern:*

Be it known that I, JOSEPHINE M. HICKS, of Boston, in the county of Suffolk and State of Massachusetts, have invented a new and useful Improvement in Cistern-Spouts and Traps therefor; and I do hereby declare the same to be described in the following specification, and represented in the accompanying drawings, of which—

Figure 1 denotes a view of a cistern and its spout provided with my invention. Fig. 2 is a vertical section, on an enlarged scale, of the trap and portions of the sections of the spout to which it is directly applied, while Fig. 3 is a side view of the same.

My invention is duly set forth in the claims hereinafter presented, the object of the invention being to intercept and prevent insects, bugs, leaves, or extraneous matters that may enter or be carried into the spout from the gutter or roof of the building to which such spout may be applied from passing into the cistern into which such spout may lead.

Rain-water cisterns are liable to have their water seriously injured by insects or vegetable matters washed into them through their spouts. With my trap applied to such a spout most, if not all, such detrimental matters are arrested in their passage down the spout, and may be readily removed from the trap as occasion may require.

In Fig. 1 of the drawings, A denotes the trap, and B B' the spout; C, the gutter from which the spout leads; D, the building of which the spout forms a part, and E the cistern.

The spout is shown as made in two separate tubular sections, B B', with the trap disposed between them.

The trap consists, not only of a hollow cylindrical or other proper shaped case or vessel, $a$, open at top and bottom, but of a woven-wire or foraminous strainer or partition, $b$, arranged within and extending across the said vessel at a suitable distance above its bottom. Besides these there is a cover, F, which, as shown in the drawings, is composed of two short cylindrical tubes or necks, $c$ $d$, and an intervening tubular conic frustum, $e$, arranged as represented, there being at the junction of the frustum and the lower neck, $d$, a flange, $f$. The tube $d$ fits into the mouth or upper end of the vessel $a$, while the tube $c$ encompasses the lower part of the upper section, B, of the spout, and is adapted thereto, so as to admit of the cover F being moved upward thereon a sufficient distance to uncover the mouth of the trap and allow of proper access being had to whatever may be caught in the trap, in order to effect its removal from the trap, as occasion may require. The flange $f$ serves to support the cover on the body of the trap.

The lower portion of the vessel A, below the strainer, is tapering and provided with a cylindrical neck, $g$, to enter the lower section, B', of the spout at its upper end, there being at the upper part of the neck a shoulder, $h$, to rest on the said upper end.

From the above it will be seen that, while the trap is supported by and between the two sections of the spout, the cover of the trap is not only sustained in place by the trap-body, but can be moved upward on the upper section of the spout in manner and for the purpose as above mentioned.

I would remark that I do not confine my invention to the precise form of the trap as represented, as it may be somewhat varied without materially changing is character and mode of operation.

I claim as my invention as follows, viz:

1. In combination with the cistern-spout made in sections, as described, the trap arranged therewith and composed of the hollow case, its strainer, and cover, as set forth, such trap being for the purpose specified.

2. The cistern-spout trap having its cover F provided with the flange $f$, and adapted to slide within the trap-body A and on the spout-portion B, as and for the purpose set forth, the said body at its lower part communicating with the spout-portion B', as explained.

JOSEPHINE M. HICKS.

Witnesses:
R. H. EDDY,
WM. W. LUNT.